(12) United States Patent
Spont

(10) Patent No.: US 11,779,824 B2
(45) Date of Patent: *Oct. 10, 2023

(54) BASKETBALL TRAINING APPARATUS FOR IMPROVING BASKETBALL SHOT MAKING AND A METHOD THEREOF

(71) Applicant: Brian Spont, San Jose, CA (US)

(72) Inventor: Brian Spont, San Jose, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 16/940,771

(22) Filed: Jul. 28, 2020

(65) Prior Publication Data

US 2021/0031089 A1 Feb. 4, 2021

Related U.S. Application Data

(60) Provisional application No. 62/879,837, filed on Jul. 29, 2019.

(51) Int. Cl.
*A63B 69/00* (2006.01)
*A63B 71/06* (2006.01)
(Continued)

(52) U.S. Cl.
CPC ...... *A63B 69/0071* (2013.01); *A63B 24/0006* (2013.01); *A63B 71/0622* (2013.01); *A63B 71/0669* (2013.01); *G09B 19/0038* (2013.01); *A63B 2024/0015* (2013.01); *A63B 2071/063* (2013.01); *A63B 2071/065* (2013.01); *A63B 2220/05* (2013.01); *A63B 2220/807* (2013.01);
(Continued)

(58) Field of Classification Search
CPC ............ A63B 69/0071; A63B 24/0006; A63B 71/0622; A63B 71/0669; A63B 2024/0015; A63B 2071/063; A63B 2071/065; A63B 2220/05; A63B 2220/807; A63B 2220/836; A63B 2225/093; A63B 2225/20; A63B 2225/50; G09B 19/0038

See application file for complete search history.

(56) References Cited

U.S. PATENT DOCUMENTS 5,299,800 A * 4/1994 Daniels ................ A63B 63/083
473/481
5,365,427 A * 11/1994 Soignet ................ A63B 69/00
473/448

(Continued)

*Primary Examiner* — Malina D. Blaise
(74) *Attorney, Agent, or Firm* — Kanika Radhakrishnan; Evergreen Valley Law Group

(57) ABSTRACT

A basketball training apparatus and a method for improving basketball shot making are disclosed. The basketball training apparatus includes a horizontal bar column, one or more brackets and a processing system. The horizontal bar column is configured to be mounted on a vertical structure and includes a plurality of longitudinal members. The one or more brackets are configured to be mounted on the vertical structure for horizontally adjoining the plurality of longitudinal members of the horizontal bar column together. The horizontal bar column is mounted onto the vertical structure using one or more brackets such that an optimum angle trajectory is created for an apex shot. The processing system operates an interactive device connected with the horizontal bar column. The interactive device is configured to track shot data associated with one or more shots performed by a player practicing on the basketball training apparatus.

15 Claims, 13 Drawing Sheets

(51) Int. Cl.
*G09B 19/00* (2006.01)
*A63B 24/00* (2006.01)

(52) U.S. Cl.
CPC ... *A63B 2220/836* (2013.01); *A63B 2225/093* (2013.01); *A63B 2225/20* (2013.01); *A63B 2225/50* (2013.01)

(56) References Cited

U.S. PATENT DOCUMENTS

| | | | | |
|---|---|---|---|---|
| 5,665,016 | A * | 9/1997 | Burnett | A63B 24/0021 473/448 |
| 5,813,926 | A * | 9/1998 | Vance | A63B 69/0071 473/433 |
| 5,833,556 | A * | 11/1998 | Ferrari | A63B 63/083 473/448 |
| 6,544,132 | B1 * | 4/2003 | Tvedt | A63B 69/0071 473/448 |
| 8,409,036 | B1 * | 4/2013 | Khananayev | A63B 71/0669 473/416 |
| 8,617,008 | B2 * | 12/2013 | Marty | G06T 7/70 473/422 |
| 9,129,153 | B2 * | 9/2015 | Ianni | G09B 19/0038 |
| 9,308,427 | B2 * | 4/2016 | Garner | A63B 41/00 |
| 9,474,953 | B1 * | 10/2016 | Duke | A63B 69/0071 |
| 9,687,713 | B1 * | 6/2017 | Duke | A63B 69/0071 |
| 10,004,949 | B2 | 6/2018 | Brothers et al. | |
| 10,080,944 | B1 * | 9/2018 | Bowling | A63B 63/083 |
| 10,220,281 | B2 * | 3/2019 | Luo | A63B 71/0605 |
| 10,537,780 | B2 * | 1/2020 | Joseph | A63B 69/0071 |
| 11,135,500 | B1 * | 10/2021 | Campbell | A63B 63/083 |
| 2004/0242350 | A1 * | 12/2004 | Elliott | A63B 63/083 473/447 |
| 2008/0312010 | A1 * | 12/2008 | Marty | A63B 71/0605 73/865.4 |
| 2012/0309566 | A1 * | 12/2012 | Ward, III | A63B 69/0071 473/448 |
| 2014/0200692 | A1 | 7/2014 | Thurman et al. | |
| 2014/0277636 | A1 * | 9/2014 | Thurman | A63B 69/0002 700/91 |
| 2014/0301601 | A1 * | 10/2014 | Marty | H04N 23/51 382/103 |
| 2015/0051023 | A1 * | 2/2015 | Aipperspach | A63B 69/0071 473/433 |
| 2015/0165294 | A1 * | 6/2015 | Wackerly | G09B 19/0038 473/448 |
| 2015/0231466 | A1 * | 8/2015 | Rickard | A63B 63/083 473/448 |
| 2016/0051880 | A1 * | 2/2016 | Hoffman | A63B 63/007 473/447 |
| 2016/0325167 | A1 * | 11/2016 | Constantin | A63B 69/0071 |
| 2017/0161561 | A1 * | 6/2017 | Marty | H04N 23/90 |
| 2017/0354856 | A1 * | 12/2017 | Nallamothu | A63B 69/0071 |
| 2020/0398135 | A1 * | 12/2020 | Horne | G09B 19/0038 |
| 2022/0212077 | A1 * | 7/2022 | Anton | A63B 63/083 |

* cited by examiner

BASKETBALL TRAINING APPARATUS FOR IMPROVING BASKETBALL SHOT MAKING AND A METHOD THEREOF

TECHNICAL FIELD

The present disclosure relates to a basketball training apparatus and, more particularly to, a system and a method for improving basketball shot making using a basketball training apparatus.

BACKGROUND

A trait that is crucial in the development of a successful athlete is consistency. A player must play consistent and accurate shots to increase proficiency and performance in sports, such as a basketball. The basketball player needs to develop consistency and accuracy in shots by repeatedly shooting the ball using an accurate and correct shooting form. One of the most important skills required for shooting accurately is releasing the basketball with an appropriate arc and follow-through in a proper direction, which in turn requires concentration, eye-hand coordination, and proper form and technique. The concentration, coordination, and form can only be improved through repetition and practice.

It is desirable for the player to practice with other players, coaches or persons who can provide guidance and feedback. However, in many instances, there may not be a sufficient number of other players, coaches or other persons available to provide the desired guidance or practice. Although basketball is a team sport, it presents opportunities for an individual player to practice and improve his or her game without the need for other players to be present. A player can develop ball-handling skills and shooting skills through individual practice with constant feedback.

In light of the above discussion, there is a need for a training apparatus that can simulate desirable practice conditions for the basketball player while providing timely feedback and instructions for improving technique.

SUMMARY

Various embodiments of the present disclosure provide a system and a method for improving basketball shot making using a basketball training apparatus.

In an embodiment, a basketball training apparatus is disclosed. The basketball training apparatus includes a horizontal bar column, one or more brackets and a processing system. The horizontal bar column is configured to be mounted on a vertical structure and includes a plurality of longitudinal members. The one or more brackets are configured to be mounted on the vertical structure for horizontally adjoining the plurality of longitudinal members of the horizontal bar column together. The horizontal bar column is mounted onto the vertical structure using the one or more brackets such that an optimum angle trajectory is created for an apex shot. The processing system operates an interactive device connected with the horizontal bar column. The interactive device is configured to track shot data associated with one or more shots performed by a player practicing on the basketball training apparatus.

In another embodiment, a basketball training system is disclosed. The basketball training system includes a basketball training apparatus and a movement device. The basketball training apparatus includes a horizontal bar column, one or more brackets and a processing system. The horizontal bar column is configured to be mounted on a vertical structure and includes a plurality of longitudinal members. The one or more brackets are configured to be mounted on the vertical structure for horizontally adjoining the plurality of longitudinal members of the horizontal bar column together. The horizontal bar column is mounted onto the vertical structure using one or more brackets such that an optimum angle trajectory is created for an apex shot. The processing system operates an interactive device connected with the horizontal bar column. The interactive device is configured to track shot data associated with one or more shots performed by a player practicing on the basketball training apparatus. The movement device is configured to be worn by the player practicing on the basketball training apparatus. The movement device is configured to detect movement data associated with the player.

In yet another embodiment, a basketball training apparatus is disclosed. The basketball training apparatus includes a backboard, a horizontal bar column and one or more brackets. The backboard is configured to be mounted on a vertical post. The horizontal bar column is configured to be mounted on the backboard and includes a plurality of longitudinal members. The one or more brackets are configured to be mounted on the backboard for horizontally adjoining the plurality of longitudinal members of the horizontal bar column together. The horizontal bar column is mounted onto the backboard using the one or more brackets such that an optimum angle trajectory is created for an apex shot.

In further yet another embodiment, a method is disclosed The method includes receiving shot data associated with a shot played by a player using a basketball on a basketball training apparatus and a movement data of the player playing the shot. The shot data includes one or more of: player position; basketball position; basketball training apparatus position; angle at which the shot is performed; and a type of the shot. The movement data includes the player position with respect to the basketball training apparatus position. The method includes calculating an optimum apex height of a horizontal bar column of the basketball training apparatus using the movement data. The method includes accessing model shot data from a database. The method includes comparing the model shot data with the shot data based, at least in part, on the optimum apex height of the horizontal bar column. The method further includes generating a feedback data for the shot based on the comparison.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
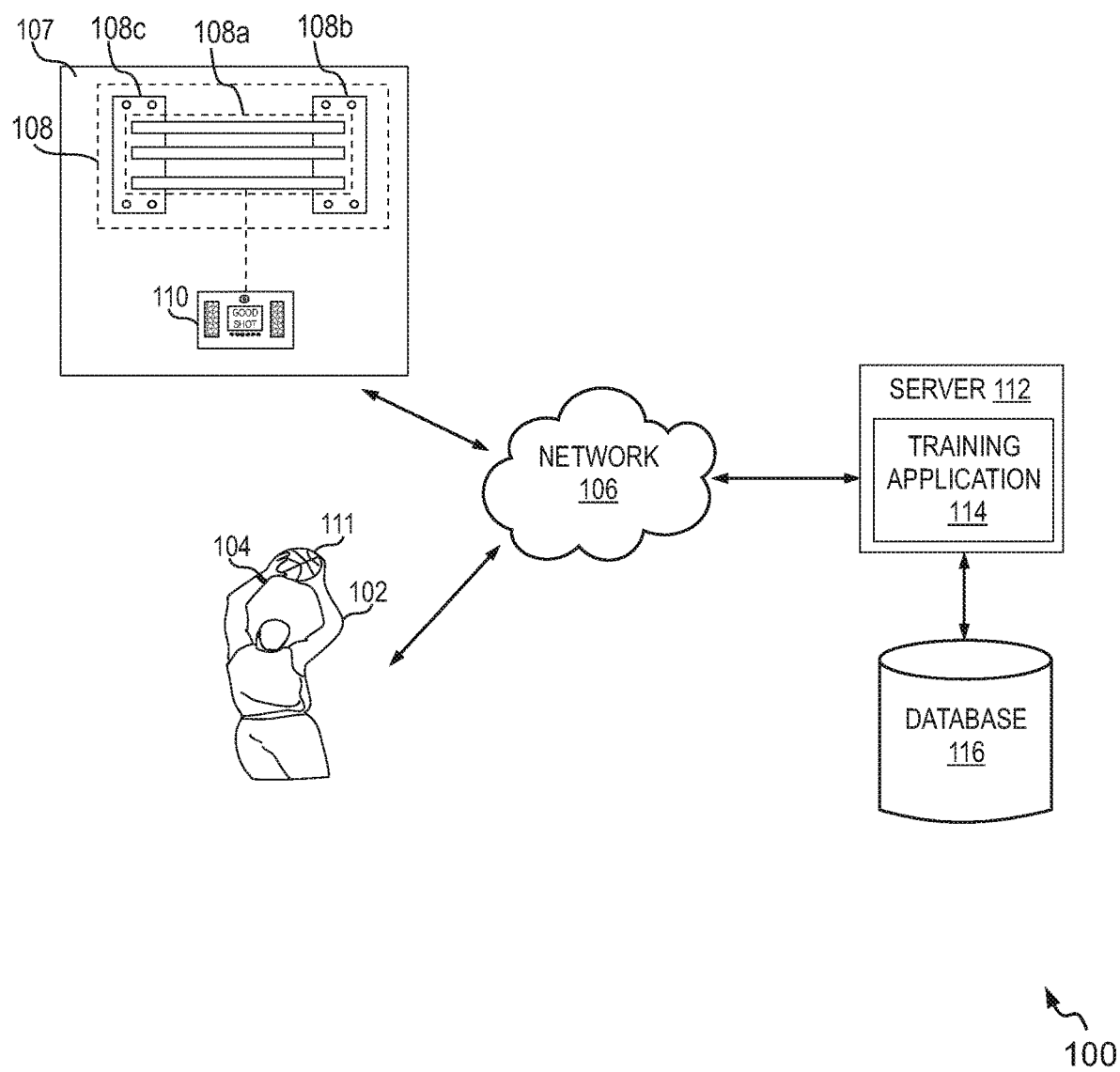
FIG. 1 illustrates an environment, where at least some example embodiment can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide a basketball training apparatus, and a method and a system for improving basketball shot making using the basketball training apparatus.

The basketball training apparatus includes a horizontal bar column and one or more brackets. The horizontal bar column is mounted onto a vertical structure, such as a wall or a backboard using the one or more brackets such that an optimum angle trajectory is created for an apex shot. The horizontal bar column is configured to help a player in establishing a proper arm angle and alignment for launch and release of a basketball that can lead to the apex shot. The horizontal bar column includes a plurality of longitudinal structures, such as pipes that are adjoined together horizontally by the one or more brackets. Each longitudinal member includes a button that is placed at a center of the respective longitudinal structure for flipping a switch to indicate a type of shot performed by the player. The horizontal bar column and the switch are connected with an interactive device. The interactive device is configured to track shot data associated with the shots played by the player while practicing on the basketball training apparatus. The interactive device includes sensors for capturing shot data associated with the player and a basketball. Further, the interactive device includes a camera for capturing position of the player relative to the basketball training apparatus.

A movement device is configured to be worn by the player practicing on the basketball training apparatus. The movement device will track movement data associated with the player. Once the shot data and the movement data are captured, a transceiver provided in the basketball training apparatus may share the shot data and the movement data with a training application provided by a server. The training application may include a movement analysis unit for generating a feedback data based on the received shot data and the movement data. In an embodiment, the position of the player relative to the basketball training apparatus that is captured by the camera can be used as the movement data for generating the feedback data. The transceiver may receive the generated feedback data from the server and then communicate the generated feedback data with the interactive device of the basketball training apparatus. The interactive device then provides feedback for the shot to the player either on a display or on a speaker included in the interactive device based on the received feedback data.

The terms 'user' and 'player' have been used interchangeably throughout the description and refer to a person who is using the basketball training apparatus.

FIG. 1 shows an example representation of an environment 100 in which various embodiments of the present invention may be practiced. The environment 100 includes, but is not limited to, a wireless communication network (e.g., a network 106) that connects entities such as a player 102, a basketball training apparatus 108 and a server 112. The player 102 is depicted to be wearing a movement device 104 on his/her wrist. The movement device 104 has a strip-like profile and is configured to track movement data associated with a player (e.g., the player 102) wearing the movement device 104. It should be noted that the one player is shown for the sake of simplicity to explain the present disclosure, and in application, there can be many such players.

The basketball training apparatus 108 includes a horizontal bar column 108a, and brackets 108b and 108c. The horizontal bar column 108a is configured to be mounted onto a vertical structure 107, such that it creates an optimum angle trajectory for an apex shot. In an embodiment, the vertical structure 107 can be a wall. In another embodiment, the vertical structure 107 can be a backboard mounted on a vertical post. The vertical post can be mounted in one of a ground; and a portable stand. In yet another embodiment, the vertical structure 107 can be the backboard mounted on the wall. The horizontal bar column 108a is supported by the brackets 108b and 108c. The horizontal bar column 108a includes a plurality of longitudinal members that are adjoined together horizontally by brackets 108b and 108c. In an embodiment, each longitudinal member of the plurality of longitudinal members is a pipe. The horizontal bar column 108a is connected with an interactive device 110. The connection between the horizontal bar column 108a and the interactive device 110 can be a wired or a wireless connection. The interactive device 110 may be configured to track shot data associated with one or more shots played by a player (e.g., the player 102) practicing on the basketball training apparatus 108. In an embodiment, the interactive device 110 can be a separate device connected wirelessly with the horizontal bar column 108a. In another embodiment, the interactive device 110 can be provided on the vertical post.

The basketball training apparatus 108 also includes one or more buttons and one or more actuators. The one or more buttons are placed at a center of the each longitudinal member of the plurality of longitudinal members. The one or more buttons may be configured to flip a switch based on a type of shot performed by the player 102 using a basketball 111. The switch is placed on the vertical structure and is connected with the interactive device 110. In an embodiment, the switch can be placed on the vertical post on which the backboard is mounted. The one or more actuators are mounted in one or more vertical track openings (shown in FIGS. 5C and 5D) provided in the vertical structure. The actuators are configured to control the brackets 108b and 108c attached to the horizontal bar column 108a to raise and lower the horizontal bar column 108a based on requirements of the player 102. For example, if the height of the player 102 is more than the height at which the horizontal bar column 108a is placed, the player 102 may require an additional height for the horizontal bar column 108a. The player 102 can use the actuators provided in the basketball training apparatus 108 for raising the horizontal bar column 108a of the basketball training apparatus 108.

In an embodiment, the one or more actuators are further controlled by a static switch provided in the basketball training apparatus 108. The static switch can be turned on and off based on the requirement of a user (e.g., the player 102) of the basketball training apparatus 108. The static switch can be turned 'off' if the user wants to fix the position of the mounted basketball training apparatus 108. The static switch can be turned 'on' if the user wants to keep the position of the basketball training apparatus 108 dynamic i.e. the position can be changed. If the static switch is turned 'on', the actuators mounted in vertical track openings will work, otherwise, the actuators will not work.

In at least one example embodiment, when the vertical structure 107 is the backboard mounted on the wall/the vertical post, the backboard can be raised and lowered using a sliding mechanism provided in the backboard based on requirements of the player 102. The sliding mechanism may include a crank that is attached to a shaft. The shaft is attached to a rod provided at a back of the backboard from one end and a rod attached to the wall/the vertical post from other end. The player 102 can use the crank to bend or release the shaft to raise or lower the backboard based on height requirement of the player 102. In an embodiment, the crank is a hand crank. In another embodiment, the crank is an automated crank.

Further, the basketball training apparatus 108 includes a plaque, a transceiver and a battery. The plaque is mounted on the vertical structure. The plaque may display shooting techniques and instructions to the player 102 for using the basketball training apparatus 108. The transceiver is configured to transfer data (shot data and movement data) related with a shot/a training session to the server 112 and to receive data (feedback data) from the server 112. The battery is configured to provide required power to the interactive device 110, the actuators, the plaque and the transceiver. In an embodiment, the battery is a wireless chargeable battery.

In an embodiment, the interactive device 110 includes one or more of one or more sensors; a camera; a speaker; and a display. The sensors may be configured to capture shot data associated with the player 102 and the basketball 111 while making a shot. The camera may capture position of the player 102 relative to the basketball training apparatus 108. The speaker may be configured to provide feedback to the player. The display is configured to display instructions for playing an apex shot and the feedback.

The basketball training apparatus 108 is configured to help the player 102 in establishing a proper arm angle and alignment for the launch and release point for the apex shot. The player 102 is required to strike on top of an upper longitudinal member of the plurality of longitudinal members by the basketball 111. The basketball training apparatus 108 is also configured to provide feedback for the attempted shot(s). For example, the basketball training apparatus 108 provides a positive audible feedback through the speaker when the player 102 successfully strikes on top of the longitudinal member with the basketball 111.

In an example scenario, the player 102 may want to practice basketball shot making on the basketball training apparatus 108. The player 102 may first read the instructions from the plaque and may start practicing the shot making. When the player 102 performs a shot, the player 102 may get to hear a sound depending on a type of shot. In some examples, the type of shot can be one of a perfect shot, a slightly off target shot, and a significantly off target shot. The type of shot is the 'perfect shot' if the player 102 strikes on top of the longitudinal member at right angle and velocity by the basketball. The shot is called as the 'slightly off target shot' if the player 102 hits on front of the top two longitudinal members, and the 'significantly off target shot' if the player 102 hits a bottom longitudinal member of the basketball training apparatus 108 by the basketball. The buttons that are placed at the center of the each longitudinal member of the plurality of longitudinal members may flip the switch to indicate the type of shot performed by the player. The switch is configured to flip in at least three ways. For each way, the switch may pass a different signal to the speaker provided in the interactive device 110. Based on the received signal, the speaker may produce a distinct sound to indicate the type of shot performed by the player. For example, if a signal received is for the perfect shot, a unique 'clank' type sound is produced by the speaker representing hitting of the bottom longitudinal member by the upper two longitudinal members. Similarly, if the signal received is for the slightly off target shot, then another unique 'clank' sound is produced by the speaker to signify hitting of the top two longitudinal members and if the signal received is for the significantly off target shot, then a unique "thud" sound is produced by the speaker.

In an embodiment, the movement device 104 worn by the player 102 may capture the movement data of the player 102 while the shot is performed by the player 102 and the sensors may capture the shot data associated with the shot played by the player 102. The movement data includes information about player position with respect to the basketball training apparatus position. The shot data includes one or more of player position, basketball position, basketball training apparatus position, angle at which the shot is performed, and a type of the shot. In at least one example embodiment, radio frequency (RF) transmitter may be worn by the player 102 instead of the movement device 104 and RF receivers may be included in the basketball training apparatus 108 and the basketball 111. So, the information collected by the RF receivers and the transmitters may be used to calculate optimum height of the bar structure relative to the position of the player.

Once the shot data and the movement data are captured, the transceiver may transfer the shot data and the movement data to the server 112 using the network 106. The network 106 may include wired networks, wireless networks and combinations thereof. Some examples of the wired networks may include, but are not limited to, Ethernet, Local Area Network (LAN), fiber channel network, and the like. Some examples of the wireless networks may include, but are not limited to, cellular networks, Wi-Fi networks, ZigBee or Bluetooth networks, and the like. An example of a combination of wired and wireless networks includes the Internet.

The server 112 may provide a software application, herein referred to as a training application 114. The training application 114 is configured to analyze the received shot data and the movement data to determine whether the shot is correctly performed by the player or not. The training application 114 is also configured to generate feedback data based on the performed analysis. For generating the feedback data, the training application 114 first calculates an optimum apex height of the horizontal bar column of the basketball training apparatus using the received movement data and then accesses model shot data from a database 116. In an embodiment, the model shot data is predefined by one or more basketball trainers and is pre-stored in the database 116. Further, the training application 114 compares the model shot data with the shot data based, at least in part, on the optimum apex height of the horizontal bar column to determine whether the shot is correctly performed by the player 102 or not. The training application 114 then generates the feedback data for the shot based on the determination, and may facilitate sending the generated feedback to the transceiver of the basketball training apparatus 108. Additionally, the server 112 may facilitate storing of the feedback data associated with each shot played by the player 102 in the database 116.

Upon generation of the feedback data, the transceiver may receive the feedback data from the server 112 using the network 106. The transceiver may then communicate the generated feedback data with the interactive device 110. The interactive device 110 is then configured to provide feedback for the shot to the player 102 either on the display or on the speaker based on the received feedback data. In an embodiment, the speaker provides the feedback in one of: a word form; and a sound form.

Further, upon conclusion of the training session when the player 102 completes practicing on the basketball training apparatus 108 by playing one or more shots in the training session, the training application 114 is configured to generate a session feedback data based on received shot data associated with one or more shots played by the player 102 and the movement data associated with the player 102 while playing each shot of the one or more shots during the training session. The session feedback data may include a score or rating for the player 102, a percentage of successful movements, a quantity of points earned, and physical information about the player such as heart rate, calories burned, or other physical milestones. The session feedback data may also include a personalized audio and/or video of a coach or an instructor providing feedback, motivation, and/or instructions for improvement of the shots played by the player 102.

The generated session feedback data is again received by the transceiver from the server 112 using the network 106 and the transceiver may then communicate the generated session feedback data with the interactive device 110. The interactive device 110 can then provide a session feedback to the player 102 based on the received session feedback data. In an embodiment, the session feedback is provided to the player 102 during a training session and/or after a training session. Additionally, the server 112 may facilitate storing of the session feedback data associated with the training session in the database 116.

In an embodiment, the training application 114 is configured to analyze performance of the player 102 based, at least in part on, the feedback data and the session feedback data that are stored in the database 116 for one or more training sessions for determining progress of the player 102. For example, the player 102 has developed any skill overtime or has achieved a milestone is determined. One or more movement goals that are initially set by the player 102 are achieved or not is also determined. The determined progress is then communicated to the player 102. For example, if the player 102 has reached a physical milestone, a pre-recorded video message may be displayed to notify or congratulate the player 102 on the achievement of the milestone. In another example, if it is determined that the player 102 has missed one or more movement goals, then a pre-recorded video message may be displayed to the player 102 to motivate and encourage the player 102.

In an embodiment, the training application 114 may be an application resting at the server 112. In an embodiment, the server 112 is configured to host and manage the training application 114 and communicate with apparatus, such as the basketball training apparatus 108. In an example embodiment, a user (e.g., the player 102) of the basketball training apparatus 108 may use his/her electronic device (not shown in figures) to access an instance of the training application 114 from the server 112 for installing the training application 114 on the electronic device from application stores. Some examples of application stored may be associated with Apple iOS™ Android™ OS, Google Chrome OS, Symbian OS®, Windows Mobile® OS, Windows Phone, BlackBerry® OS, Embedded Linux, web OS, Palm OS® or Palm Web OS™, and the like. The training application 114 may be accessed through the web via the network 106. In an embodiment, the training application 114 may be accessed through the web using Internet. The training application 114 installed on the electronic device may provide instructions and feedbacks to the user for the shots played by the user in the one or more training sessions.

Figure 8:
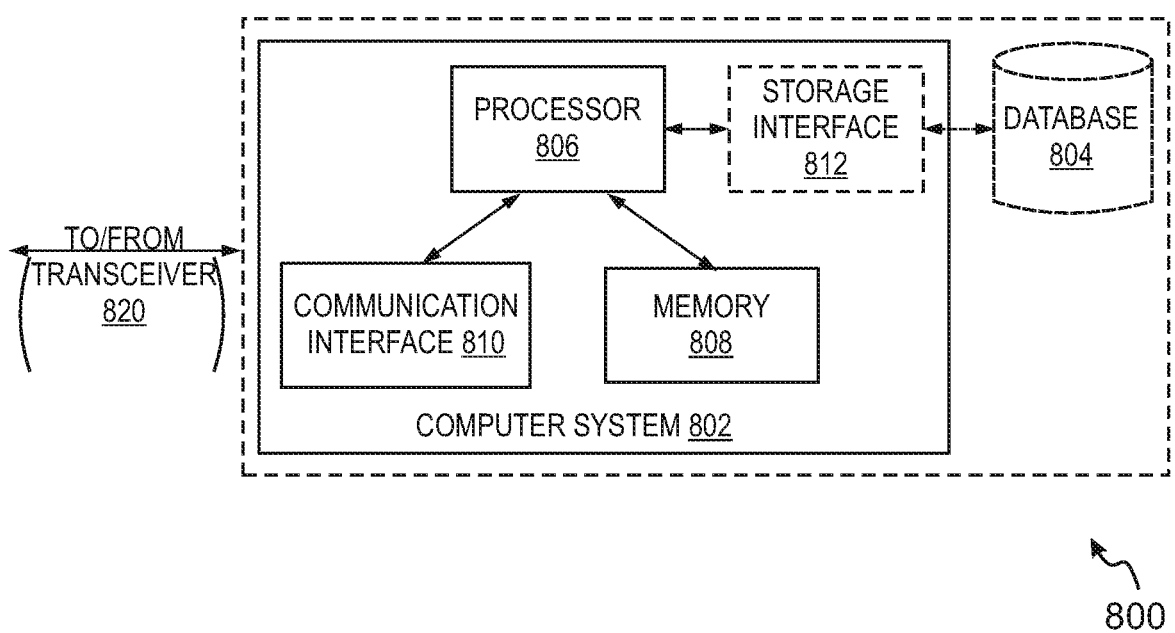
FIG. 8 is a simplified block diagram of a server system, in accordance with an example embodiment.

It is noted that the instructions (or the executable code) configuring the training application 114 are stored in a memory of the server 112, and the instructions are executed by a processor (for example, a single-core or a multi-core processor) included within the server 112, as is exemplarily shown with reference to FIG. 8. Accordingly, even though the various functionalities for providing feedback to the players practicing basketball shot making are explained with reference to or being performed by the training application 114, it is understood that the processor in conjunction with the code in the memory is configured to execute the various tasks as enabled by the instructions of the training application 114.

Figure 2A:
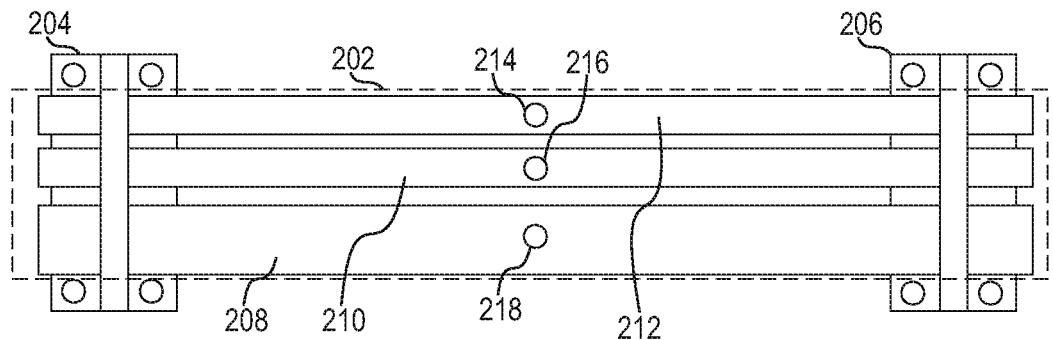
FIGS. 2A and 2B illustrate a front view and a top view of a basketball training apparatus, respectively, in accordance with an example embodiment.
Figure 2B:
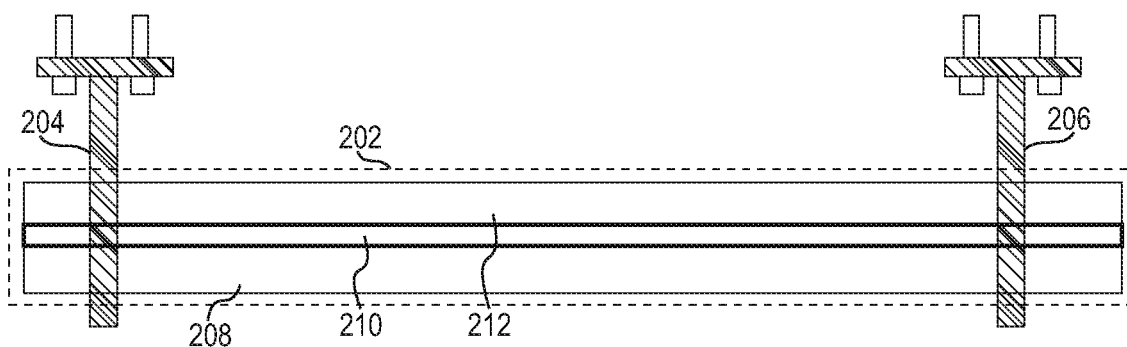

FIGS. 2A and 2B illustrate a front view and a top view of a basketball training apparatus 200, respectively, in accordance with an example embodiment. The basketball training apparatus 200 is an example of the basketball training apparatus 108 shown and explained with reference to FIG. 1. The basketball training apparatus 200 includes a horizontal bar column 202 and brackets 204 and 206. As shown in FIGS. 2A and 2B, the horizontal bar column 202 is mounted onto a vertical structure i.e. a wall, such that it creates an optimum angle trajectory for an apex shot. The horizontal bar column 202 is mounted on the wall with the support of the brackets 204 and 206.

The horizontal bar column 202 includes the plurality of longitudinal members 208, 210 and 212. Each longitudinal member of the plurality of longitudinal members 208, 210 and 212 includes a button. As shown in FIGS. 2A and 2B, the plurality of longitudinal members 208, 210 and 212 are pipes 208, 210 and 212, respectively. A lower pipe 208, a middle pipe 210 and an upper pipe 212 are provided in the horizontal bar column 202 and includes buttons 214, 216 and 218, respectively. The pipes 208, 210 and 212 are adjoined together horizontally by the brackets 204 and 206. The brackets 204 and 206 are placed at peripheral ends along the length of the pipes 208, 210 and 212 and are designed to mount against a flat support surface of the wall. The brackets 204 and 206 are configured to secure the pipes 208, 210 and 212 together.

The buttons 214, 216 and 218 are configured to flip a switch provided on the vertical structure i.e. wall based on a type of shot performed by a player (e.g., the player 102) on the basketball training apparatus 200. The switch is further connected with an interactive device (e.g., the interactive device 110) to convey information about the type of shot performed by the player.

As shown in the FIGS. 2A and 2B, without loss of generality, the horizontal bar column 202 may include one '4' inch pipe and two '1' inch pipes, where each pipe will be about '4' feet long. The pipes 208, 210 and 212 are stacked vertically and an inch gap is maintained between each pipe of the pipes 208, 210 and 212 of the horizontal bar column 202 using the brackets 204 and 206. The pipes 208, 210 and 212 are stacked in a manner such that the '4' inch pipe (lower pipe 208) is placed at a lower position, followed by the first '1' inch pipe (middle pipe 210) at the central position and the second '1' inch pipe (upper pipe 212) at the upper position.

In an embodiment, the pipes 208, 210 and 212 of the horizontal bar column 202 may be removably attached and may be configured in any number of shapes and sizes. In one embodiment, the horizontal bar column 202 is removably attachable to the brackets 204 and 206. In other embodiments, the horizontal bar column 202 may be attached to other parts such as a display and the like.

The horizontal bar column 202 may help a player (e.g., the player 102) in establishing a proper arm angle and alignment for launch and release of a basketball for an apex shot. The player is required to strike on top of the upper pipe 212.

The basketball training apparatus 200 is configured to provide feedback for attempted shot(s). For example, the basketball training apparatus 200 may provide a positive audible feedback when the player successfully strikes on top of the upper pipe 212. The basketball training apparatus 200 may be constructed out of any suitable material or materials, including, but are not limited to, polyvinyl chloride (PVC) pipe, aluminium pipe, galvanized pipe, conduit, steel pipe, plastic, wood, fiberglass or other appropriate materials or a combination thereof. The selection of different materials will be based on the desired characteristics and intended use of the basketball training apparatus 200. For example, if the basketball training apparatus 200 is to be used by children or if weight and portability of the basketball training apparatus 200 are important, then PVC or aluminium pipe or plastic materials may be preferred materials for constructing the basketball training apparatus 200. Same or similar materials may be preferred if the primary use of the basketball training apparatus 200 will be outdoors. Likewise, if the basketball training apparatus 200 will be used by older shooters or in other conditions, different materials, such as steel may be more or less desirable.

The dimensions of basketball training apparatus 200 may be useful for simulating certain desirable simulations, and can be selectively adjustable by the player. For example, the basketball training apparatus 200 may include one or more adjustable attachments that can provide additional heights. Such attachments can either be integral part of the basketball training apparatus 200 or may be removably attached to basketball training apparatus 200, or any other element of basketball training apparatus 200. The basketball training apparatus 200 may also be configured to include advertising, personalization or other information or content.

Figure 3A:
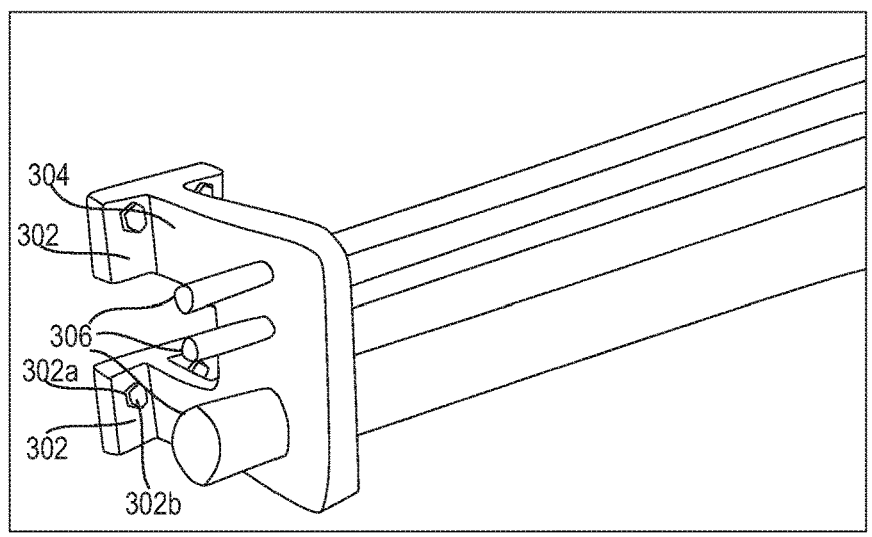
FIGS. 3A and 3B illustrate a perspective view and a side view of a bracket, respectively, in accordance with an example embodiment.
Figure 3B:
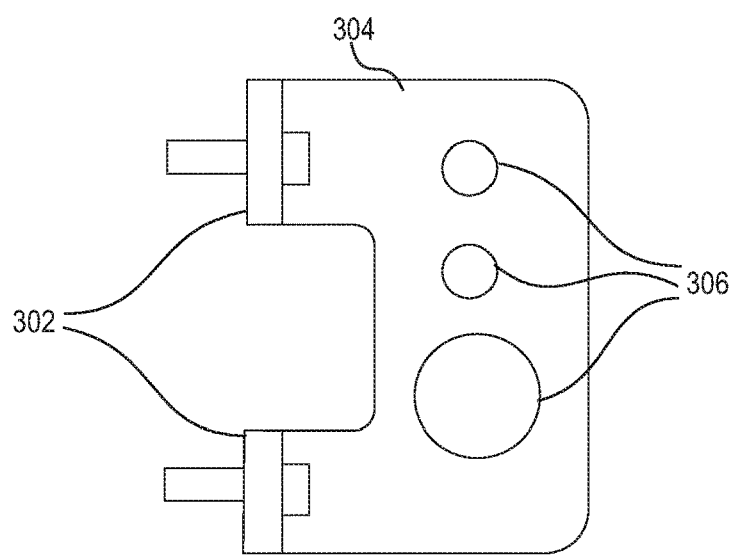

FIGS. 3A and 3B illustrate a perspective view and a side view of a bracket 300, respectively, in accordance with an example embodiment. The bracket 300 is an example of the brackets 204 and 206 shown and explained with reference to FIGS. 2A and 2B.

The bracket 300 includes a mounting portion 302. The mounting portion 302 has a mounting face for being disposed against and secured to a flat support surface of the vertical structure, such as a wall. The mounting portion 302 may also have one or more fastener holes 302a pre-formed therein for receiving one or more fasteners 302b, such as nail(s), bolt(s), or screw(s) to mount the mounting portion 302 in the vertical structure. Alternatively, fastener holes may be drilled of a size and in location(s) as deemed necessary or desirable by the end-user, depending upon the installation location of the bracket 300, weight of piping component to be supported by the bracket 300 and composition of the vertical structure to which the bracket 300 is to be secured. In addition, or as a further alternative, the mounting portion 302 may be secured with an adhesive material being used as a fastener.

The bracket 300 also includes a longitudinal member supporting portion that includes an extended arm portion 304. The extended arm portion 304 is configured to engage and support at least a portion of an outer circumferential surface of the longitudinal members (e.g., the pipes 208, 210 and 212 shown in FIGS. 2A and 2B). The extended arm portion 304 of the bracket 300 is configured to extend in a plane perpendicular to the mounting portion 302 of the bracket 300. The extended arm portion 304 can be defined as a rectangular segment that includes a plurality of circular receptacle 306 for receiving the plurality of longitudinal members 208, 210 and 212 of a horizontal bar column (e.g., the horizontal bar column 202).

Further, the bracket 300 includes one or more securing means for securing the at least one longitudinal member in the at least one circular receptacle 306. The securing means ensures that a pipe is seated in the receptacle 306 of the extended arm portion 304. Examples of the securing means that can be used include, but are not limited to, button attachments, snaps, hooks, Velcro-type fastening material, and other similar mechanical fasteners.

Figure 4:
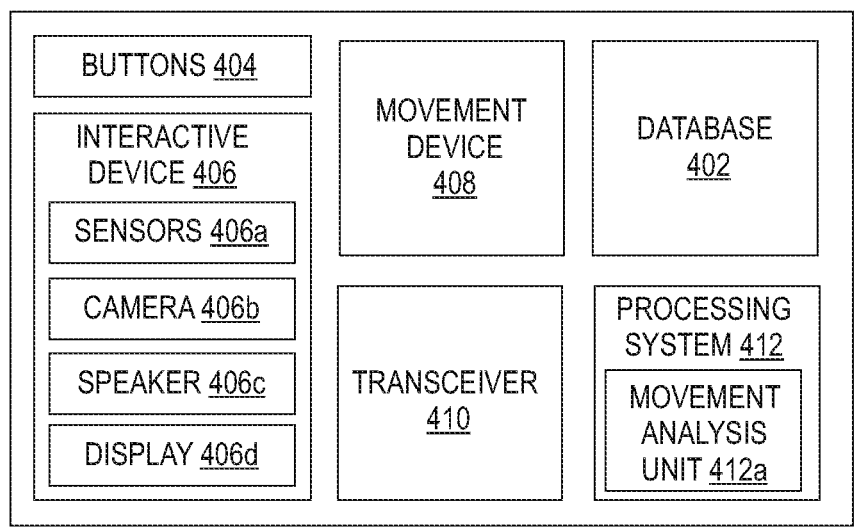
FIG. 4 is a block diagram of a system for improving basketball shot making, in accordance with an example embodiment.

FIG. 4 is a block diagram of a system 400 for improving basketball shot making, in accordance with an example embodiment. The system 400 is configured to collect shot data and movement data and to provide feedback based on the shot data and movement data. In an embodiment, the system 400 includes a database 402, one or more buttons 404, an interactive device 406, a movement device 408, a transceiver 410, and a processing system 412.

The database 402 is configured to store shot data associated with each shot played by each player (e.g., the player 102) of the one or more players practicing on the basketball training apparatus 200. The database 402 is also configured to store training data defined by one or more trainers and to store profile data associated with each player of the one or more players. In an embodiment, the training data includes model shot data and instructions for each type of shot that can be played by the one or more players. The profile data includes personal information, such as name, age, interests of the player, milestones and goals set by the player. Further, the database 402 is configured to store feedback data associated with each shot played by the each player and the session feedback data associated with each training session attended by the each player of the one or more players practicing on the basketball training apparatus 200. Additionally, the database 402 is configured to store a series of data points regarding shots attempted by each player to maintain a training history for each player. The database 402 may be continuously or periodically updated to include new statistics for the each player.

The one or more buttons 404 are configured to pass a current to flip a switch based on the type of shot performed by each player. The switch is meant to flip in at least three ways to indicate the type of shot performed by a player. For each way, the switch may pass a signal to the interactive device 406. Based on the received signal, the interactive device 406 may instruct a speaker 406c to produce a distinct sound to indicate the type of shot performed by the player and may instruct a display 406d to display a message to indicate the type of shot. For example, if a player hits a top bar/pipe at a right angle and velocity, the switch will be flipped in a way that represents the perfect shot and a signal indicating the perfect shot will be sent to the interactive device 406. Based on the received signal, the interactive device 406 may instruct the speaker 406c to produce a unique sound. If the player hits the front of the top two bars/pipes, another unique sound will be produced by the speaker 406c. Similarly, if the player only hits the bottom bar/pipe, the speaker 406c may produce a unique "thud" sound. The produced sound may help the player in determining the type of shot played by the player.

The interactive device 406 is in communication with the one or more buttons 404. The interactive device 406 is configured to track shot data associated with one or more shots performed by each player practicing on the basketball training apparatus. In an embodiment, the interactive device 406 includes one or more of: one or more sensors 406a, a camera 406b, a speaker 406c and a display 406d. In alternative embodiments, the interactive device 406 may also include a controller, a touch screen, a microphone, a sensor, a game pad, a keyboard, a joystick, a pointer device such as a mouse, or another suitable interface device along with the one or more sensors 406a, the camera 406b, the speaker 406c and the display 406d. The one or more sensors 406a are configured to capture shot data associated with each player and/or a basketball with which each player is playing. The shot data for the each player includes one or more of: a player position; a basketball position; a basketball training apparatus position; an angle at which the shot is performed; and a type of the shot. In an embodiment, the type of the shot is one of: a perfect shot; a slightly off target shot; and a significantly off target shot. Examples of the sensors 406a include, but are not limited to, ultrasonic sensors, proximity sensors, laser distance sensors etc.

The camera 406b is configured to capture position of each player and a basketball associated with each player. In an embodiment, the camera 406b is a depth camera that is configured to capture and map objects in a training area, such as the player, the basketball and the basketball training apparatus 200. The mapping of the objects may help in capturing position of the player relative to the basketball training apparatus that further helps in calculating an optimum apex height for the horizontal bar column 202 of the basketball training apparatus 200.

The speaker 406c is configured to provide feedback to each player based, at least in part on, the type of shot performed by each player and the feedback data received for the respective player. The speaker 406c provides the feedback in one of: a word form; and a sound form. For example, when a player successfully performs a shot, the speaker 406c may provide a confirmation indication such as a spoken message "Good job". A distinct sound can be played for the each type of shot when the speaker provides the feedback in the sound form. For example, when the basketball strikes on top of the upper pipe, a sound, such as a chime or a crowd cheer may be played by the speaker 406c. In an embodiment, the speaker 406c can also provide music or an audio beat for a training session. In an embodiment, the speaker 406c is a Bluetooth speaker.

The display 406d is configured to display instructions and the feedback based, at least in part on, the type of shot performed by the player and the feedback data received for the respective player. The instructions may include instruction for performing a typical shot or to perform a movement. The display 406d is also configured to display session feedbacks and statistics. The statistics may include data such as how many times a player has achieved a perfect shot in a training session. Further, the display 406d is configured to display pre-recorded messages to notify or congratulate the player on achievement of a milestone or to motivate and encourage the player.

The movement device 408 is configured to track movement data associated with each player of the one or more players. The movement data includes the player position with respect to the basketball training apparatus position. The movement device 408 includes necessary electronics that are required for tracking movement data associated with each player.

The transceiver 410 is configured to wirelessly transfer the shot data and the movement data associated with each shot played by each player of the one or more players to a processing system, such as the processing system 412. The transceiver 410 is also configured to receive the feedback data for the each shot played by each player from the processing system 412. In an embodiment, the transceiver 410 can be a RF transceiver that is configured to transmit and receive data (e.g., the shot data, the movement data and the feedback data) using radio frequency. In another embodiment, the transceiver 410 can be a cellular transceiver configured to transmit and receive data using a cellular network. In other embodiments, the transceiver 410 may be a local area network transceiver, such as a wireless network device, configured to transmit and receive data using a local area network and an internet connection. Further, the transceiver 410 is configured to transmit and receive data to and from the movement device 408. Additionally, the transceiver 410 is configured to update the database 402.

The processing system 412 is configured to coordinate with the interactive device 406, the transceiver 410 and the database 402 for operation of the interactive device 406 (the sensors 406a, the camera 406b, the speaker 406c and the display 406d), the transceiver 410 and the database 402. The processing system 412 is also configured to process the shot data and the movement data received from the transceiver 410. The processing system 412 includes a movement analysis unit 412a that is configured to analyze the shot data and the movement data received for each shot to generate a feedback data for the respective shot. In an embodiment, the movement data can be data tracked by the movement device 408. In another embodiment, the movement data can be data captured by the camera 406b. For generating the feedback data, the movement analysis unit 412a may first access the model shot data from the database 402 and then compare the model shot data with the shot data to determine whether the shot is correctly performed by the player or not. The movement analysis unit 412a then generates the feedback data for the respective shot based on the determination.

The movement analysis unit 412a is also configured to generate a session feedback data for each training session attended by each player based on shot data associated with one or more shots played by each player and the movement data associated with each player while playing each shot of the one or more shots during the training session. Additionally, the movement analysis unit 412a is configured to analyze performance of each player based, at least in part on, the feedback data and the session feedback data that are stored in the database 402 for one or more training sessions attended by the each player. The performance of each player may be further utilized by the movement analysis unit 412a to determine progress of the respective player. The determining progress of a player includes determining whether a milestone is achieved by the player or determining whether one or more movement goals predefined by the player are achieved or not.

The processing system 412 is also configured to store the feedback data and the session feedback data in the database 402. The processing system 412 is also configured to facilitate sending of the shot feedback data and the session feedback data to each player based on the generated shot feedback data and the session feedback data for the respective player.

In an embodiment, the processing system 412 may store a code for the training application, and the code may include any suitable programming language, such as Unity, C++, Visual Basic, or other computer coding language in any dialect such as English, Spanish, or other language or dialect. Alternatively, the training code is stored on external media, such as flash memory, DVD, CD, Blu-Ray, or other suitable electronic storage medium.

Figure 5A:
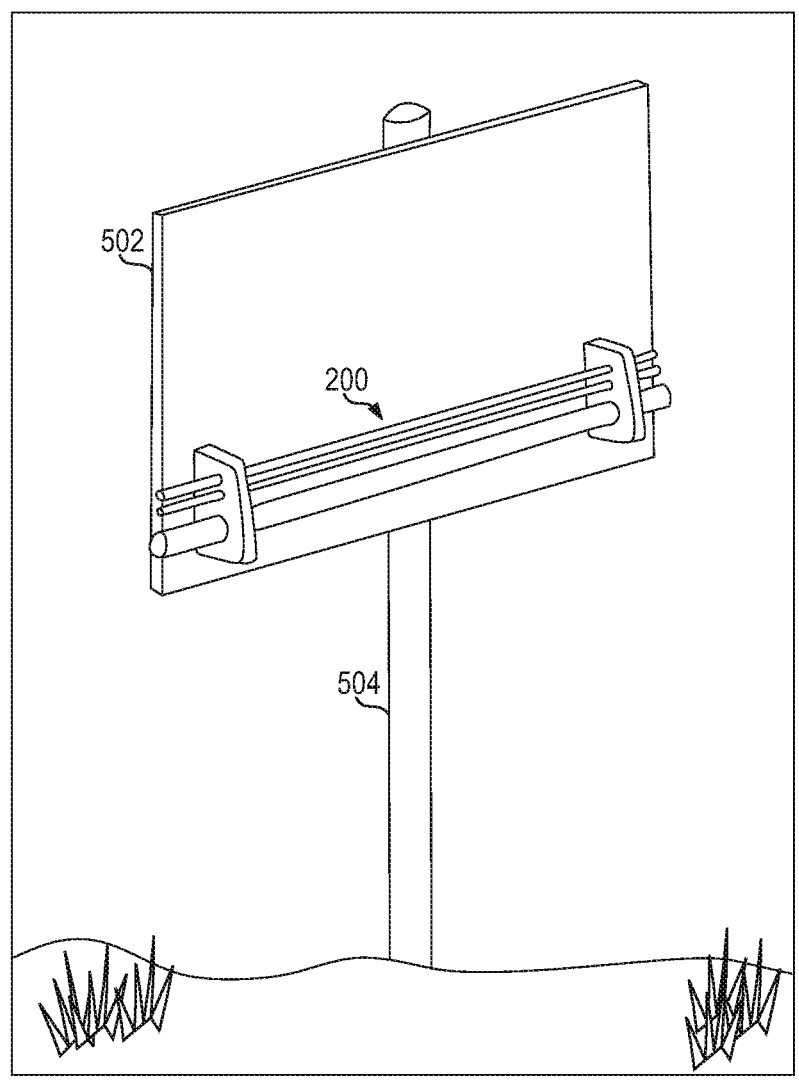
FIG. 5A shows a perspective view of a basketball training apparatus statically mounted on a backboard, in accordance with an example embodiment.

FIG. 5A shows a perspective view of a basketball training apparatus 200 statically mounted on a backboard 502, in accordance with an example embodiment. The backboard 502 is a raised vertical board that is mounted on a vertical post 504. The vertical post 504 is further mounted on the ground. A static switch provided in the basketball training apparatus 200 is turned 'off', so the basketball training apparatus 200 is fixed in the position shown in the FIG. 5A.

Figure 5B:
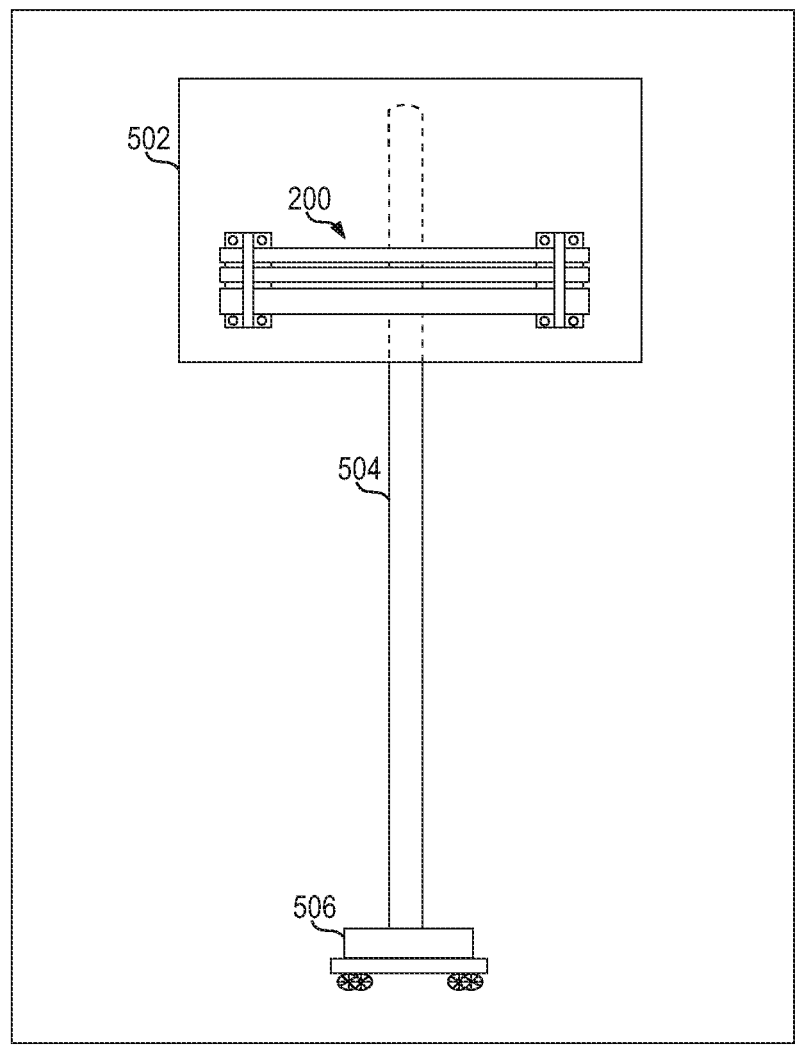
FIG. 5B shows a front view of the basketball training apparatus statically mounted on the backboard, in accordance with another example embodiment.

FIG. 5B shows a front view of the basketball training apparatus 200 statically mounted on the backboard 502, in accordance with another example embodiment. The backboard 502 is mounted on the vertical post 504 that is mounted on a portable stand 506. The portable stand 506 provides mobility to the vertical post 504. So, a user of the basketball training apparatus can place the basketball training apparatus anywhere depending on his/her choice.

Figure 5C:
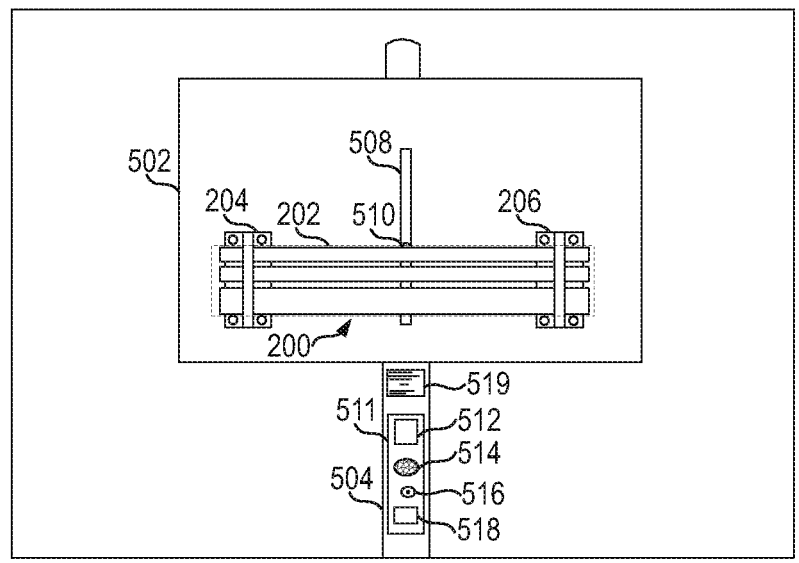
FIG. 5C shows a front view of the basketball training apparatus dynamically mounted on the backboard, in accordance with an example embodiment.

FIG. 5C shows a front view of the basketball training apparatus 200 dynamically mounted on the backboard 502, in accordance with an example embodiment. The backboard 502 is mounted on the vertical post 504 and includes a vertical track opening 508. The vertical post 504 can be mounted on the ground or on the portable stand.

An actuator 510 is mounted the vertical track opening 508. The actuator 510 controls brackets 204 and 206 attached to the horizontal bar column 202 of the basketball training apparatus 200 to raise and lower the horizontal bar column 202 based on requirements of the user (e.g., the player 102). An interactive device 511 is placed on the vertical post 504. The interactive device 511 includes a display 512, a speaker 514, a camera/sensors 516, and touchscreen controls 518 for tracking shot data associated with one or more shots performed by a player (e.g., the player 102) practicing on the basketball training apparatus 200.

A plaque 519 is mounted on the vertical post 504. The plaque 519 is configured to display shooting techniques and instructions for using the basketball training apparatus 200 that may help in training the player.

Figure 5D:
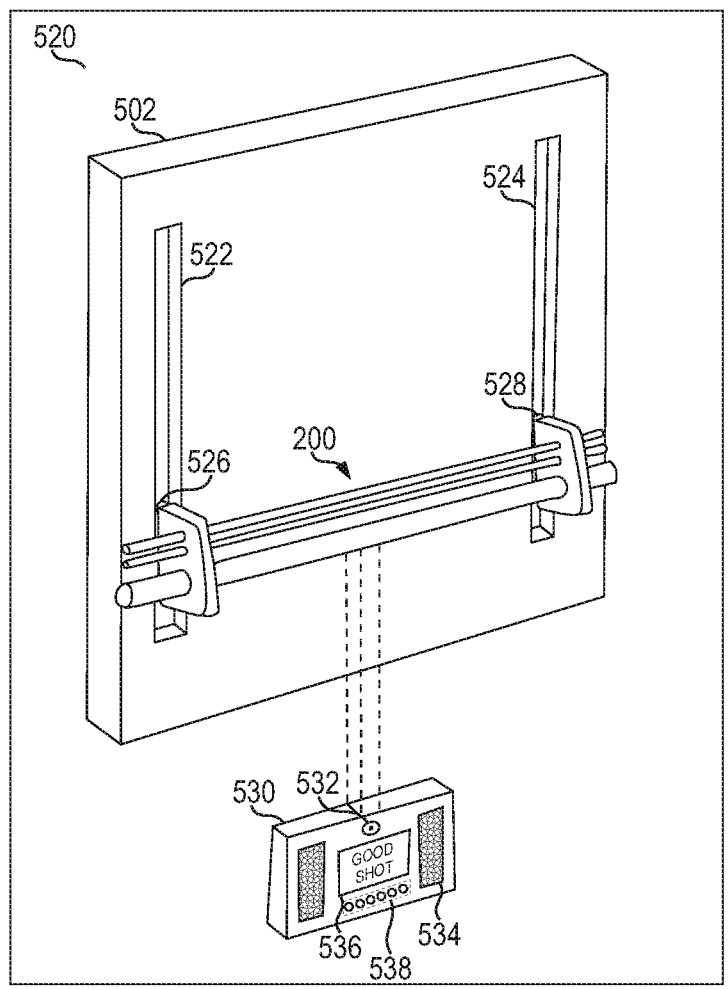
FIG. 5D shows a perspective view of the basketball training apparatus dynamically mounted on the backboard, in accordance with another example embodiment.

FIG. 5D shows a perspective view of the basketball training apparatus 200 dynamically mounted on the backboard 502, in accordance with another example embodiment. The backboard 502 is mounted on a wall 520 and includes two vertical track openings 522 and 524.

Two actuators 526 and 528 are mounted in the vertical track openings 522 and 524 provided in the backboard 502. The actuator 526 mounted in the vertical track opening 522 controls the bracket 204 and the actuator 528 mounted in the vertical track opening 524 controls the bracket 206.

An interactive device 530 is shown to be connected with the horizontal bar column 202 of the basketball training apparatus 200. The interactive device 530 can be connected wirelessly or with wire to the horizontal bar column 202 of the basketball training apparatus 200. The interactive device 530 includes a camera/sensor 532, speakers 534, a display 536 and control buttons 538. The camera 532 may capture position of the player relative to the basketball training apparatus 200. The speakers 534 and the display 536 may provide feedback to the player. The control buttons 538 can be used by the player for controlling operations, such as increasing volume of the speakers 534, changing brightness of the display 536 etc., of the interactive device 530.

Figure 5E:
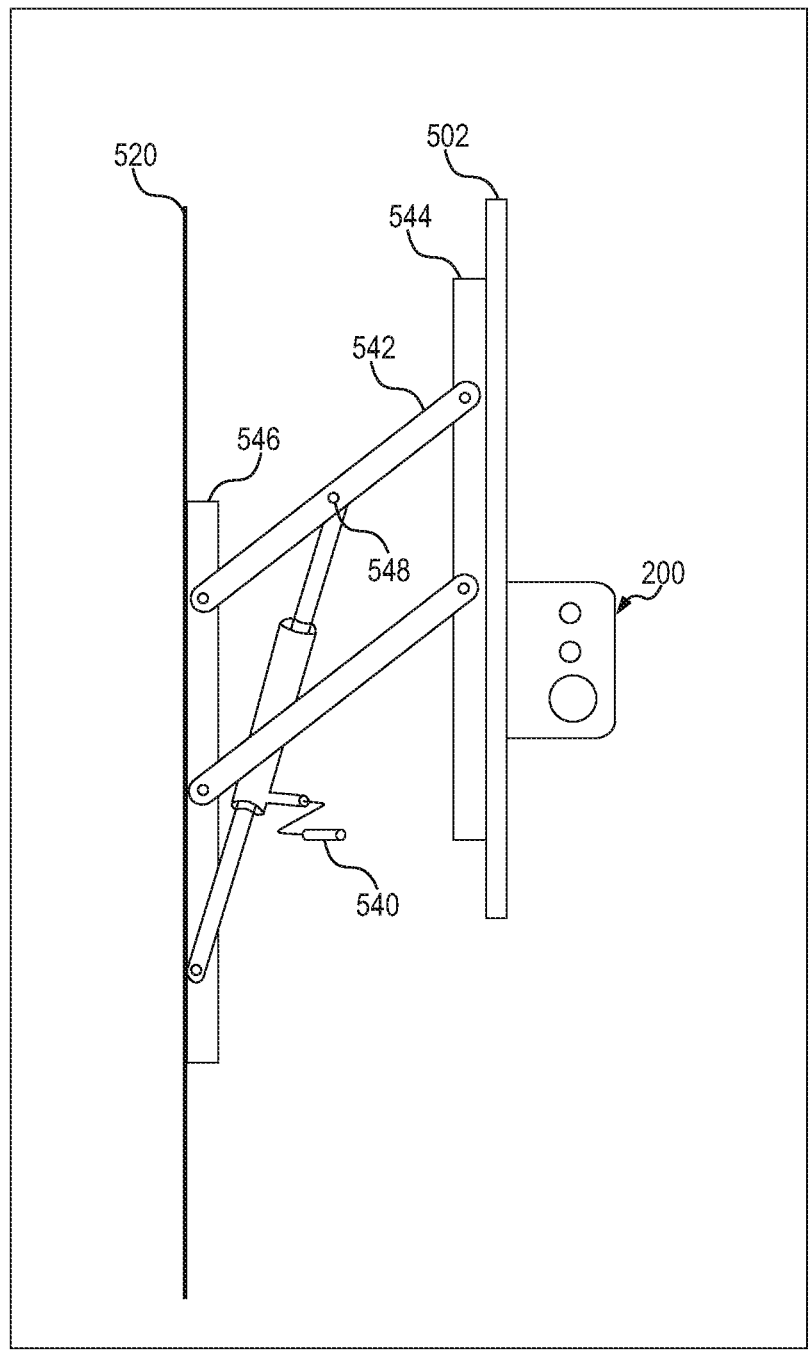
FIG. 5E shows a side view of the basketball training apparatus mounted on the backboard, in accordance with an example embodiment.

FIG. 5E shows a side view of the basketball training apparatus 200 mounted on the backboard 502, in accordance with an example embodiment. The backboard 502 is dynamically mounted on the wall 520 using a sliding mechanism. The sliding mechanism provided in the backboard 502 is used to raise and lower the backboard 502 based on requirements of the player. The sliding mechanism includes a hand crank 540 that is attached to a center of a shaft 542 using a fastener 548. The shaft 542 is further attached to a rod 544 provided at a back of the backboard 502 from one end and a rod 546 attached to the wall 520 from other end. The player can use the hand crank 540 to bend or release the shaft 542 to raise or lower the backboard 502 based on height requirements of the player 102.

Figure 6:
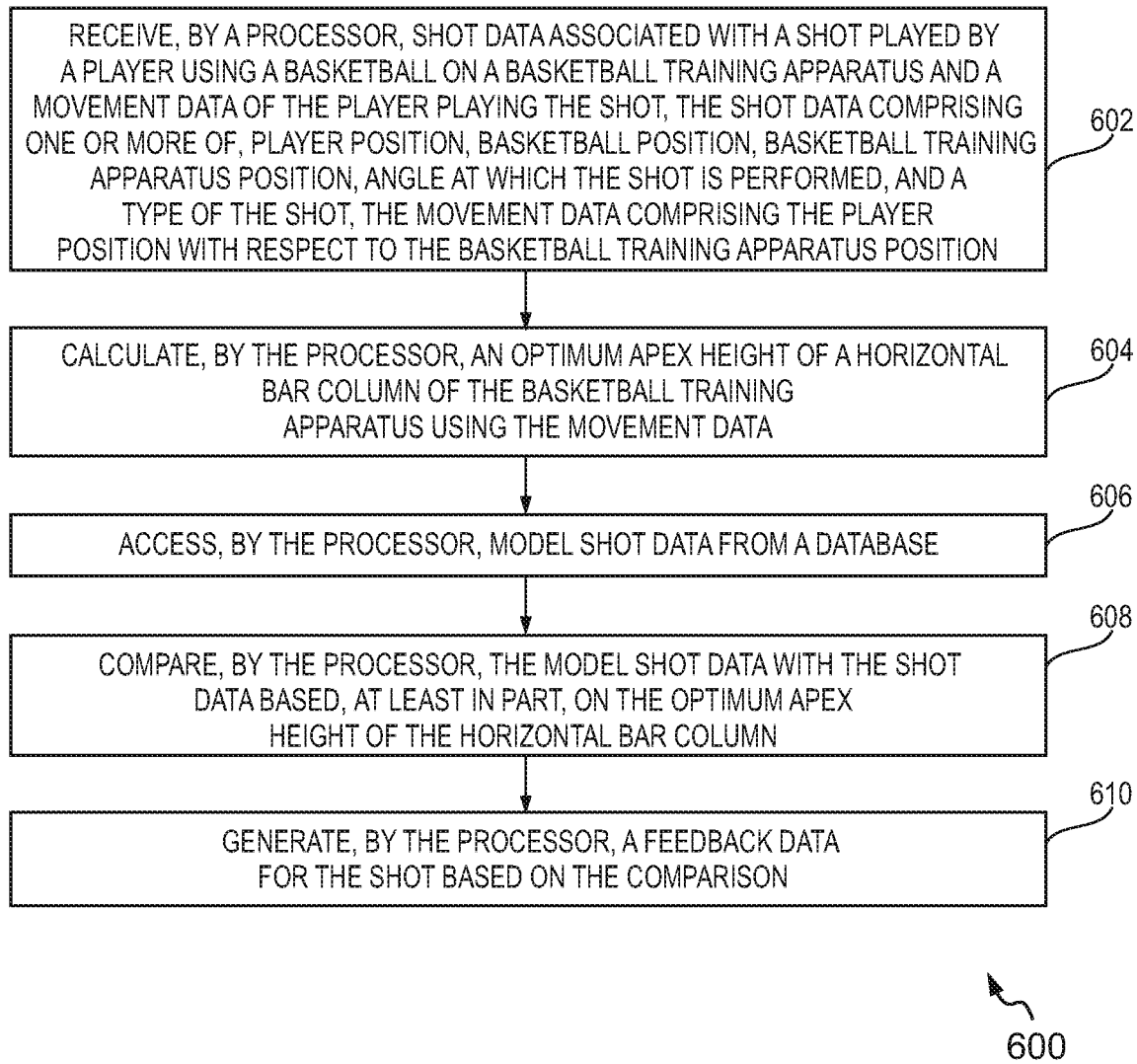
FIG. 6 is a flowchart illustrating a method for improving basketball shot making, in accordance with an example embodiment.

FIG. 6 is a flowchart illustrating a method 600 for improving basketball shot making, in accordance with an example embodiment. The operations of method 600 may be carried out by a server such as the server 112 or by the system 400. The sequence of operations of the method 600 may not be necessarily executed in the same order as they are presented. Further, one or more operations may be grouped together and performed in form of a single step, or one operation may have several sub-steps that may be performed in parallel or in sequential manner.

At operation 602, the method 600 includes receiving, by a processor, a shot data associated with a shot played by a player (e.g., the player 102) using a basketball on a basketball training apparatus (e.g., the basketball training apparatus 108) and a movement data of the player playing the shot. The shot data is collected by an interactive device (e.g., the interactive device 110) included in the basketball training apparatus and the movement data is collected by a movement device (e.g., the movement device 104) worn by the player playing the shot. The shot data includes one or more of player position, basketball position, basketball training apparatus position, angle at which the shot is performed, and a type of the shot. The movement data includes the player position with respect to a position of the basketball training apparatus.

At operation 604, the method 600 includes calculating, by the processor, an optimum apex height of a horizontal bar column of the basketball training apparatus using the movement data. The optimum apex height is calculated based on the player position with respect to the position of the basketball training apparatus.

At operation 606, the method 600 includes accessing, by the processor, model shot data from a database (e.g., the database 116). In an embodiment, the model shot data is predefined by one or more basketball trainers and is pre-stored in the database. The model shot data includes information such as what should be a proper arm angle and alignment for a launch of the basketball for a certain apex height and what should be a release point of the basketball for making a perfect shot.

At operation 608, the method 600 includes comparing, by the processor, the model shot data with the shot data based, at least in part, on the optimum apex height of the horizontal bar column. The model shot data is compared with the collected shot based on the optimum apex height to determine what needs to be done for making a perfect shot for the mentioned optimum apex height.

At operation 610, the method 600 includes generating, by the processor, a feedback data for the shot based on the comparison. The feedback data is generated based on the comparison of the model shot data and the collected shot. The feedback data may include instructions for improving the shot, messages for motivating or encouraging the player etc.

Figure 7A:
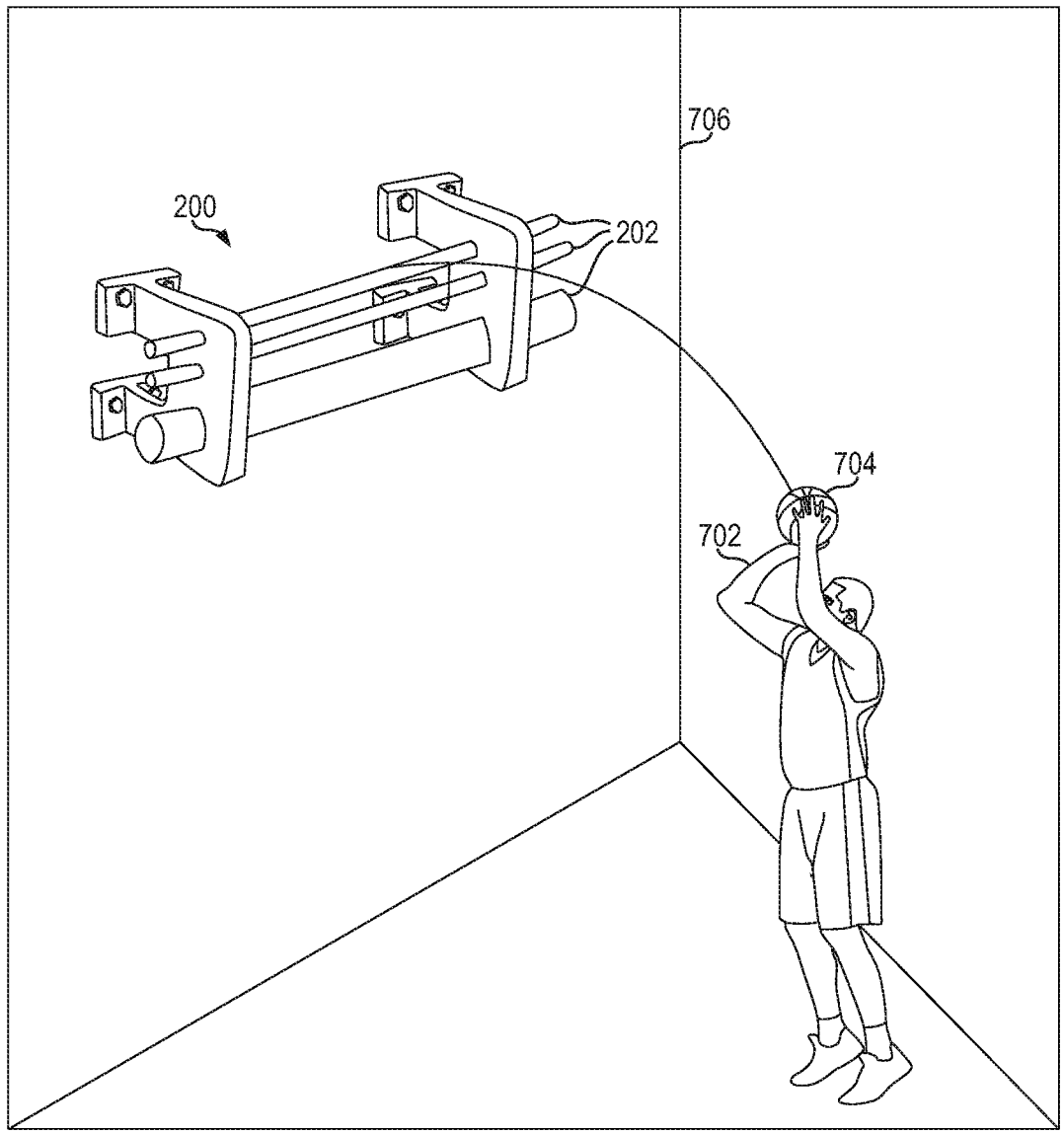
FIGS. 7A and 7B illustrate exemplary shot making scenario using the basketball training apparatus, in accordance with an example embodiment.
Figure 7B:
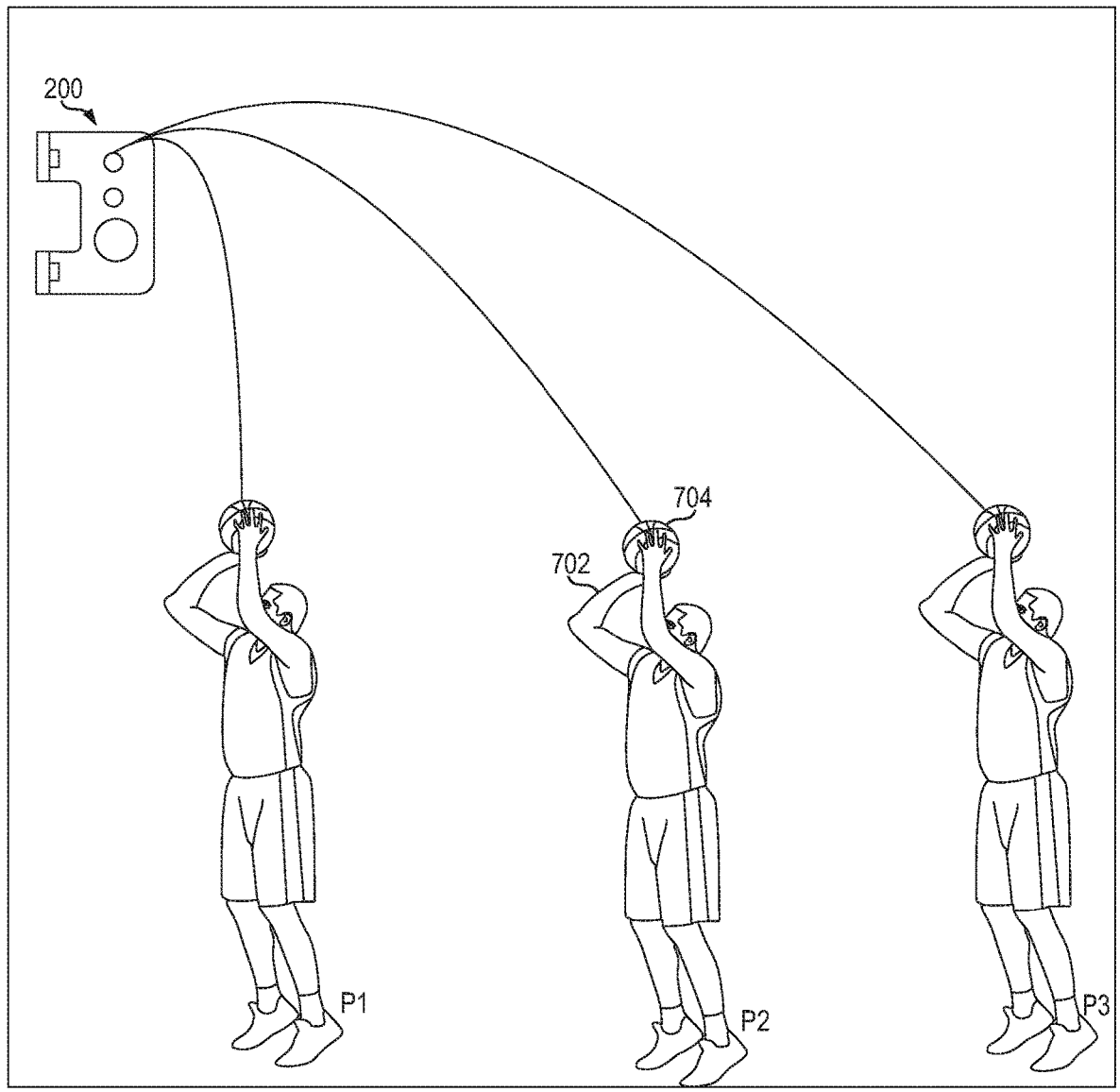

FIGS. 7A and 7B illustrate exemplary shot making scenario using the basketball training apparatus 200, in accordance with an example embodiment.

As seen in FIG. 7A, a player 702 is standing at a distance, say at least 2 ft away from a vertical structure i.e. a wall 706. The player 702 is trying to strike on top of a longitudinal member i.e. an upper pipe of the horizontal bar column 202 with a basketball 704 to get a perfect shot.

As shown in FIG. 7B, the basketball training apparatus 200 has an ability to adjust configurations for practicing apex shots from varying locations, such as positions P1, P2 and P3 by the player 702. For example, an arm angle and alignment that is required for launch and release of the basketball 704 from the position P1 that can lead to the apex shot will be different from the arm angle and alignment required for position P2 and P3.

The basketball training apparatus 108 explained with reference to FIG. 1 can be placed for use in a gym, fitness club, training center, recreational center, community center, arcade, or other fitness or gaming location, or in a home setting. The basketball training apparatus 108 may improve a player's ball-handling, practice drill execution, interactive skill development, player development, cardiovascular training, strength, and conditioning. In some embodiments, the basketball training apparatus 108 can also be considered as exercise equipment or fitness equipment, or a sports training self-help item.

The basketball training apparatus 108 and 200 disclosed herein, may be used by users, including but are not limited to, aspiring basketball players, student athletes, coaches, personal trainers, skill-instructors, player development coordinators, gym members, fitness club members, recreational center members, community center members, and others who desire to play an interactive game.

Various example embodiments offer, among other benefits, techniques for establishing a method and a system for improving basketball shot making using a basketball training apparatus. The system is configured to provide feedback for each shot as well as for each training session, thereby helping a player in improving an arm angle and alignment that is required for launch and release of the basketball with each played shot. The system tracks progress of the player in all the training session attended by the player and informs the player about the same, thereby motivating and encouraging the player for playing better shots. The basketball training apparatus is easy to use, can be easily assembled and disassembled, and is light weight and compact, thereby making it easily transportable and storable.

The disclosed systems and methods with reference to FIGS. 1 to 7A-7B, or one or more operations of the method 600 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

FIG. 8 is a block diagram of a server system 800, in accordance with an example embodiment. The server system 800 is an example of the server 112 shown and explained with reference to FIG. 1. The server system 800 includes a computer system 802 and one or more databases, such as a database 804.

The computer system 802 includes a processor 806 for executing instructions. The processor 806 is an example of the processing system 412 shown and explained with reference to FIG. 4. Instructions may be stored in, for example, but not limited to, a memory 808. The processor 806 may include one or more processing units (e.g., in a multi-core configuration). The processor 806 is operatively coupled to a communication interface 810 such that the computer system 802 is capable of communicating with a device such as a transceiver 820.

The processor 806 may also be operatively coupled to the database 804 such as, but not limited to, plurality of applications. The database 804 is configured to store the training application 114 capable of generating feedback data as explained with reference to FIGS. 1 to 7. The database 804 is any computer-operated hardware suitable for storing and/or retrieving data. The database 804 may include multiple storage units such as hard disks and/or solid-state disks in a redundant array of inexpensive disks (RAID) configuration. The database 804 may include, but not limited to, a storage area network (SAN) and/or a network attached storage (NAS) system.

In some embodiments, the database 804 is integrated within the computer system 802. For example, the computer system 802 may include one or more hard disk drives as the database 804. In other embodiments, the database 804 is external to the computer system 802 and may be accessed by the computer system 802 using a storage interface 812. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 806 with access to the database 804.

The memory 808 is a storage device embodied as one or more volatile memory devices, one or more non-volatile memory devices, and/or a combination of one or more volatile memory devices and non-volatile memory devices, for storing micro-contents information and instructions. The memory 808 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

Various example embodiments offer, among other benefits, a basketball training apparatus, and a method and a system for improving basketball shot making using the basketball training apparatus. The basketball training apparatus provides equipment that can be used for practicing, training, exercising, and practicing basketball skills, thereby improving the balance, footwork, control, core strength, stability and flexibility of a user using the basketball training apparatus. The system provides the feedback to the person for each shot played by the person along with a session feedback for a training session, thereby helping the person in improving the shot making skills.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various blocks of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus creates a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application/or implementation without departing from the spirit or scope of the claims.

What is claimed is:
1. A basketball training apparatus, comprising:
a horizontal bar column configured to be mounted on a vertical structure, the horizontal bar column comprising a plurality of longitudinal members;

one or more brackets configured to be mounted on the vertical structure for horizontally adjoining the plurality of longitudinal members of the horizontal bar column together, wherein the horizontal bar column is mounted onto the vertical structure using the one or more brackets such that an optimum angle trajectory is created for an apex shot; and a processing system for operating an interactive device connected with the horizontal bar column, the interactive device configured to track shot data associated with one or more shots performed by a player practicing on the basketball training apparatus.

2. The basketball training apparatus as claimed in claim 1, wherein each bracket of the one or more brackets comprises:

a mounting portion comprising one or more fastener holes for receiving one or more fasteners to mount the mounting portion in the vertical structure;

an extended arm portion configured to extend in a plane perpendicular to the mounting portion, the extended arm portion comprising a plurality of circular receptacles for receiving the plurality of longitudinal members of the horizontal bar column; and one or more securing means for securing the plurality of longitudinal members in the plurality of circular receptacles.

3. The basketball training apparatus as claimed in claim 1, further comprising:

one or more buttons placed at a center of each longitudinal member of the plurality of longitudinal members for flipping a switch based on a type of shot performed by the player using a basketball, wherein the switch is placed on the vertical structure and is connected with the interactive device;

a plaque mounted on the vertical structure for training the player by displaying shooting techniques and instructions for using the basketball training apparatus;

one or more actuators mounted in one or more vertical track openings in the vertical structure, the one or more actuators configured to control the one or more brackets attached to the horizontal bar column to raise and lower the horizontal bar column based on requirements of the player; and a transceiver for transferring and receiving data to and from the processing system.

4. The basketball training apparatus as claimed in claim 3, wherein the interactive device comprises:

one or more sensors for capturing the shot data associated with the player and the basketball; and a camera for capturing position of the player relative to the basketball training apparatus.

5. The basketball training apparatus as claimed in claim 4, wherein the processing system is further configured to analyse the shot data and the position of the player relative to the basketball training apparatus to generate feedback data.

6. The basketball training apparatus as claimed in claim 5, wherein the interactive device further comprises:

a speaker for providing feedback to the player based, at least in part on, the type of shot performed by the player and the feedback data; and a display for displaying instructions and the feedback based, at least in part on, the type of shot performed by the player and the feedback data.

7. The basketball training apparatus as claimed in claim 6, wherein the speaker provides the feedback in one of: a word form; and a sound form.

8. The basketball training apparatus as claimed in claim 7, wherein the type of shot is at least one of: a perfect shot; a slightly off target shot; and a significantly off target shot, and wherein a distinct sound is created for each type of shot when the speaker provides the feedback in the sound form.

9. The basketball training apparatus as claimed in claim 1, wherein each longitudinal member of the plurality of longitudinal members is a pipe.

10. The basketball training apparatus as claimed in claim 1, wherein the vertical structure is one of: a wall; and a backboard.

11. The basketball training apparatus as claimed in claim 10, further comprising:

a sliding mechanism configured in the backboard for raising and lowering the backboard based on requirements of the player when the vertical structure is the backboard.

12. A basketball training apparatus, comprising:

a backboard configured to be mounted on a vertical post;

a horizontal bar column configured to be mounted on the backboard, the horizontal bar column comprising a plurality of longitudinal members;

one or more brackets configured to be mounted on the backboard for horizontally adjoining the plurality of longitudinal members of the horizontal bar column together, wherein the horizontal bar column is mounted onto the backboard using the one or more brackets such that an optimum angle trajectory is created for an apex shot; and an interactive device placed on the vertical post and connected with the horizontal bar column, the interactive device being configured to track shot data associated with one or more shots performed by a player practicing on the basketball training apparatus.

13. The basketball training apparatus as claimed in claim 12, wherein the vertical post is mounted in one of: a ground; and a portable stand.

14. The basketball training apparatus as claimed in claim 12, further comprising:

one or more buttons placed at a center of each longitudinal member of the plurality of longitudinal members for flipping a switch based on a type of shot performed by the player using a basketball, wherein the switch is placed on the vertical post and is connected with the interactive device;

a plaque mounted on the vertical post for training the player by displaying shooting techniques and instructions for using the basketball training apparatus; and one or more actuators mounted in one or more vertical track openings in the backboard, the one or more actuators configured to control the one or more brackets attached to the horizontal bar column to raise and lower the horizontal bar column based on requirements of the player.

15. The basketball training apparatus as claimed in claim 14, wherein the type of shot is at least one of: a perfect shot; a slightly off target shot; and a significantly off target shot, wherein a distinct sound is created for each type of shot.

* * * * *